United States Patent

[11] 3,597,743

[72] Inventors William J. Murphy
Suffern;
Alan S. Rosenthal, New York, both of, N.Y.

[21] Appl. No. 810,521
[22] Filed Mar. 26, 1969
[45] Patented Aug. 3, 1971
[73] Assignee Digital Applications, Inc.
Houston, Tex.
by said Rosenthal

[54] EXPANDER FOR REAL-TIME COMMUNICATION BETWEEN A COMPUTER AND EXTERNAL DEVICES
18 Claims, 5 Drawing Figs.

[52] U.S. Cl. .......... 340/172.5
[51] Int. Cl. .......... G06f 9/18
[50] Field of Search .......... 340/172.5; 235/157

[56] References Cited

UNITED STATES PATENTS

| | | | |
|---|---|---|---|
| 3,210,733 | 10/1965 | Terzian et al. | 340/172.5 |
| 3,221,309 | 11/1965 | Benghiat | 340/172.5 |
| 3,267,434 | 8/1966 | Clark et al. | 340/172.5 |
| 3,283,308 | 11/1966 | Klein et al. | 340/172.5 |
| 3,419,852 | 12/1968 | Marx et al. | 340/172.5 |
| 3,430,209 | 2/1969 | Goshorn et al. | 340/172.5 |
| 3,475,729 | 10/1969 | Porcelli et al. | 340/172.5 |
| 3,479,649 | 11/1969 | Bahrs et al. | 340/172.5 |

*Primary Examiner*—Gareth D Shaw
*Assistant Examiner*—Sydney Chirlin
*Attorney*—Robertson, Bryan, Parmelee & Johnson

ABSTRACT: A device is described for expanding the real-time access channel of a digital computer to enable the computer to communicate with a large number of external devices. A plurality of channels are arranged in groups, with each group forming a feature adapter. A plurality of feature adapters are shown connectable to the computer. A controller provides the necessary control functions to manipulate the data which may be sent to or demanded from the computer on an interrupt request basis or under direct program control.

INVENTORS
ALAN S. ROSENTHAL
WILLIAM J. MURPHY
BY
Sandoe, Hopgood & Calimafde
ATTORNEYS INVENTORS
ALAN S. ROSENTHAL
WILLIAM J. MURPHY
BY
Sandoe, Hopgood & Calimafde
ATTORNEYS INVENTORS
ALAN S. ROSENTHAL
WILLIAM J. MURPHY
BY
Sandoe, Hopgood & Calimafde
ATTORNEYS INVENTORS
ALAN S. ROSENTHAL
WILLIAM J. MURPHY
BY
Sandoe, Hopgood & Calimafde
ATTORNEYS INVENTORS
ALAN S. ROSENTHAL
WILLIAM J. MURPHY
BY
Sandoe, Hopgood & Calimafde
ATTORNEYS

EXPANDER FOR REAL-TIME COMMUNICATION BETWEEN A COMPUTER AND EXTERNAL DEVICES

This invention relates to a device for expanding the number of external devices with which a digital computer may communicate on a real time basis.

Most general purpose digital computers are provided with a real time access channel to permit the computer to communicate with an external device directly even while performing normal computing services. Such a device may be, for instance, a typewriter or a teletype machine or the like. In order to obtain frequent and/or large data flow communications between a general purpose computer and a plurality of external devices, special features must be added to the computer so that it could no longer be labeled as a general purpose machine.

There are many industrial applications where it is desirable for a general purpose computer to communicate on a real time basis with a large number of external devices, for example in the field of process controls. Computer control of industrial processes requires that many sensed parameters of the process such as temperature and pressure must be inputted to the digital computer for process analysis, correction and the like. Usually, the parameters and process steps being monitored must be sampled at a sufficiently high rate to assure that the computer has an up-to-date knowledge of the status of the process.

With a complicated manufacturing process, the number of parameters to be sampled and the rate of sampling are likely to impose such an extensive load on the general purpose computer real time access channel that it is unable to serve the functions required by the process without adding special features.

Although difficulties may be encountered with the input and output of data through the real time access channel, it should be realized that most digital computers can operate on data at rates well in excess of that required for the monitoring or control of many of the processes it is connected with. Thus the computer may be idle for a significant time and for efficient use should be employable to perform other functions unrelated to the process monitoring and control. One could argue that if such excess capability in the computer exists, it ought to be more economical to use a slower machine, as such machines are usually available at lower rental costs.

However, a slower machine is not always more economical to the manufacturer. A slower machine generally does not have the needed growth potential, thus forcing a manufacturer to switch to a faster machine at a commonly not so distant future time. Such a conversion can be very expensive in view of the usually long "down time" involved to accommodate hardware interface problems as well as "debug" the software, i.e. computer programs. In addition, the slower general computer still must be capable of accommodating the flow of data to and from the process apparatus through a real time access channel.

The selection of a computer thus requires consideration of many factors such as the needs of the manufacturer, the growth potential of the plant, the costs, other interim functions that the computer may perform, etc. Generally, these factors naturally dictate the use of a general purpose computer which has a greater capability than what the immediate process controls dictate as being necessary. Yet, to design special features in a general purpose computer to enable it to communicate with a large number of external devices on a real time basis is expensive.

It is therefore an object of this invention to provide an expander device for a general purpose digital computer to enable the general purpose computer to communicate with a plurality of external devices associated for instance with a manufacturing process to enable the computer to monitor and control the process.

It is a further object of this invention to provide an expander which may interconnect a plurality of external devices to a computer on a real time basis with a wide selection of communication variations.

It is still further an object of this invention to provide an expander for a general purpose digital computer having a real time access channel to permit the computer to input and output data from external devices on an interrupt request basis from the external devices.

The above-mentioned and other features and objects of this invention and the manner of attaining them will become more apparent and the invention itself will best be understood by reference to the following description of an embodiment of the invention taken in conjunction with the accompanying drawings, the description of which follows.

Briefly stated, our invention contemplates the use of a plurality of channels which are composed of data lines connected to external devices and wherein the channels are formed in groups with each group forming a feature adapter and wherein a plurality of feature adapters are in controllable communication with a real time access channel of a general purpose digital computer under the direction of a central controller.

Figure 1:
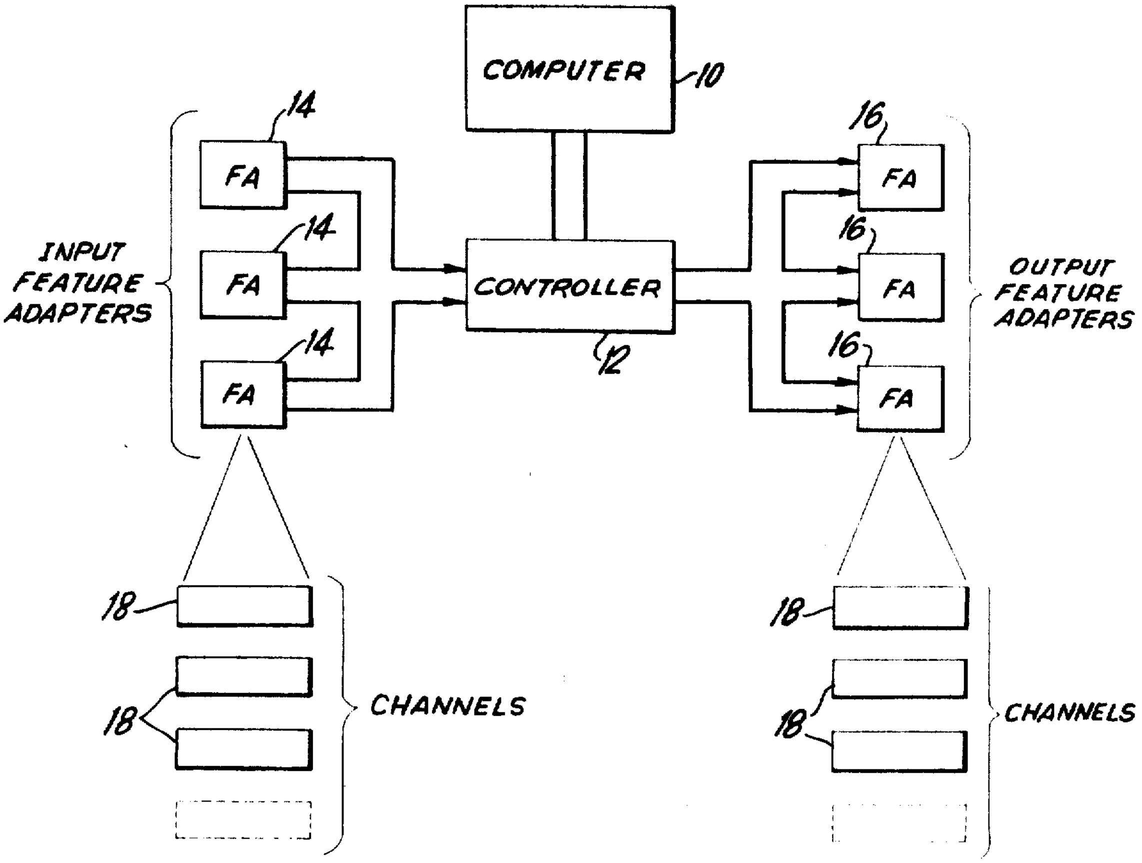
FIG. 1 is a general block diagram of the expander of this invention.

With reference to FIG. 1, we show a general purpose computer 10 which communicates with a controller 12 to control the flow of data from a plurality of input feature adapters such as 14, the output feature adapters such as 16. Each one of the feature adapters may be composed of a plurality of channels such as 18. The computer may address data to a particular channel within a feature adapter or may receive data from a particular channel under its general computer program control or the data may be inputted to the computer on an interrupt basis as will be explained. Generally, each of the channels within a feature adapter is connected to an external device such as for instance a pressure sensor (not shown) or an analog-to-digital converter for an input channel (FIG. 3) or a digital-to-analog converter for an output channel (not shown).

The types of external devices that may be in communication with the general purpose computer 10 through the controller can be as varied as the process controls encountered in industry with the usual general limitations that the sampling times are within the capabilities of the general purpose computer. Generally, the maximum speed for parameters to be sampled for process control is of the order of 250 cycles per second (cps), leaving a substantial amount of computer time between sampling periods if the computer cycle time is of the order of microseconds.

Figure 2A:
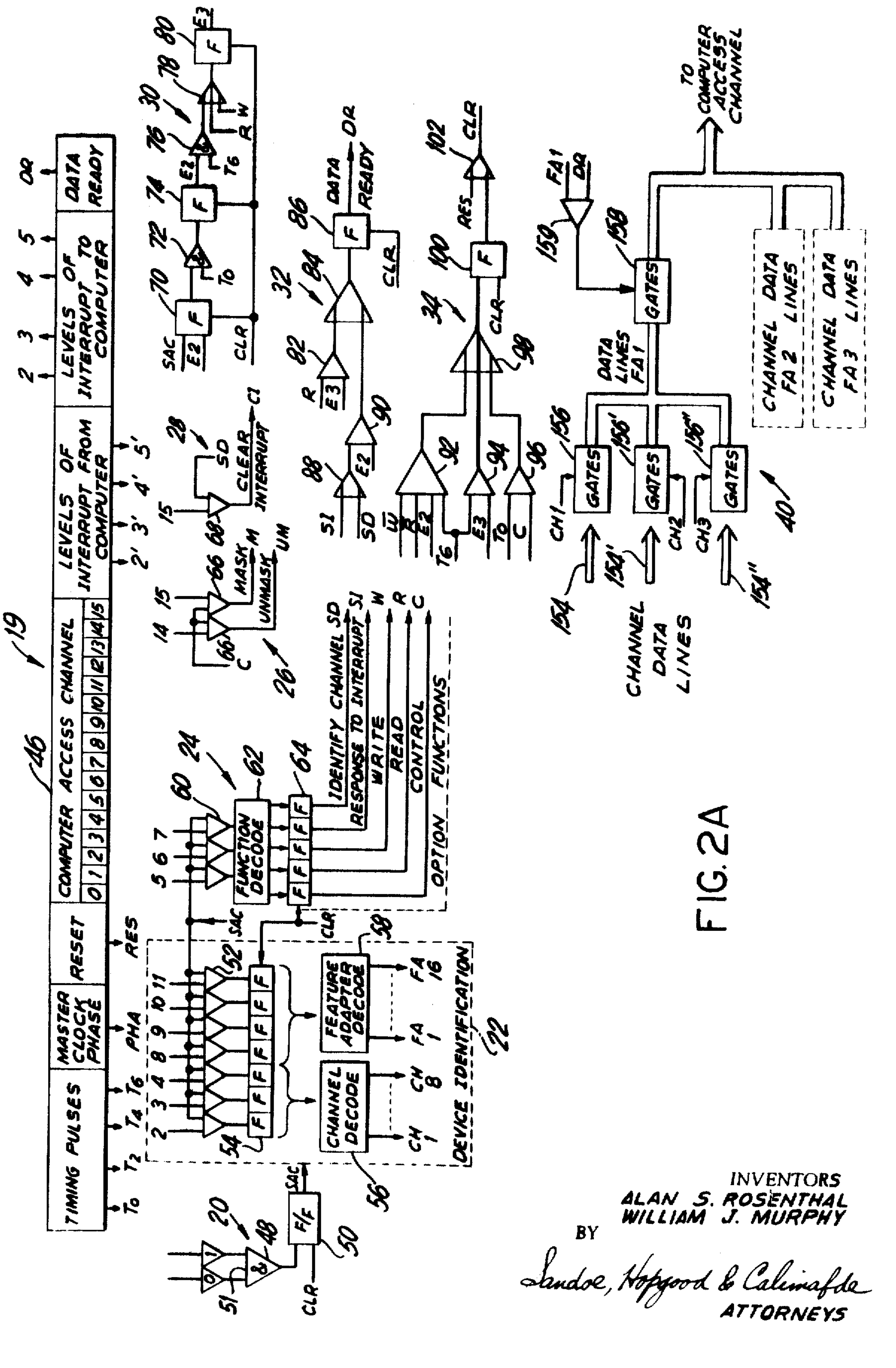
FIG. 2A and FIG. 2B are a logic diagram and a general block diagram illustrating the expander of this invention in greater detail than shown in FIG. 1.

FIG. 2A shows, on the top thereof, a summary of the type of signals that may be employed to permit the communication between the controller 12 and the general purpose computer 10 via the real time access channel of the computer 10. Several portions of the control circuits shown in FIG. 2A are set out by dotted lines to indicate specific functions. To enhance and facilitate understanding of the controller employed with this invention, a brief excursion through the logic diagram is first made.

A recognition circuit 20 is used to recognize when the expander is addressed by the computer. A device identification circuit 22 monitors selected bits in the computer access channel to identify particular channel feature adapters addressed by the computer. A function decode network 24 is employed to recognize particular operating functions to be performed in accordance with data from the computer real time data access employed to recognize when particular interrupts are to be prevented, as for instance when the computer "starts up" its control of a manufacturing process. A clear interrupt circuit 28 recognizes when an interrupt initiated by an external device is to be cleared upon command from the computer. A cycle time generating circuit 30 is used to derive particular timing enabling signals to permit the controller to route data properly to and from the computer. A data ready network 32 is employed to indicate when data is ready for inputting to the computer. Generally, at the end of each computer communication, the various networks such as flip-flops within the controller must be reset to prepare for subsequent communications. For this purpose, a clear signal generating network 34 is employed.

Figure 2B:
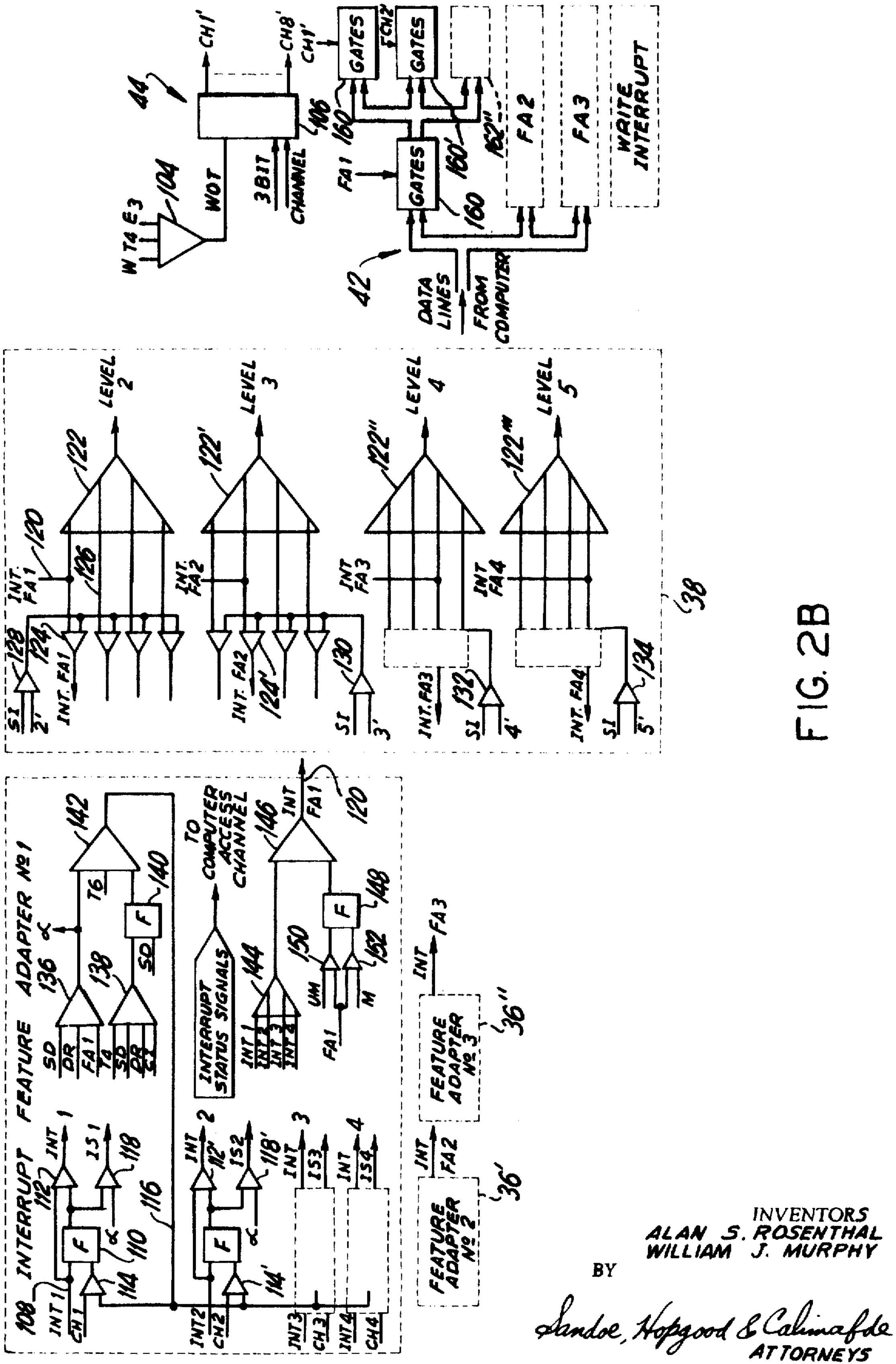

An important feature of this invention involves the generation and control of interrupt signals from external devices. The networks for manipulating and controlling the interrupts are shown with some detail in the interrupt network 36 FIG. 2B for a particular feature adapter such as number one and is illustrated in block diagram form for other feature adapters at 36' and 36''. The interrupt signals from each of the feature adapters are combined in an interrupt interconnection network 38 which interconnects the various interrupts from the feature adapters to initiate specific levels of interrupt to the computer as will be described in more detail. The block diagram shown as network 40 FIG. 2A illustrates the interconnection of the various data lines from channels and feature adapters to for instance input information to the computer access channel. Similarly, an output data line interconnection network 42 FIG. 2B is provided for transmitting data from the computer to the various external devices connected to the channels. A logic control circuit for initiating the writing of information from the computer to an external device is generally located at 44.

A summary of all of the direct communication lines between the controller 12 and the computer 10 is shown at 19 wherein a group of timing pulses is derived from the computer such as $T_0$, $T_2$, $T_4$ and $T_6$. These timing pulses are each of a width of approximately a half microsecond and occur at intervals of 2 microseconds. These times of course will vary for different computers but the values indicated may be considered typical. The main function of these timing pulses is to coordinate the transmission of data between the expander and the computer in a synchronous relationship with the events occuring within the computer. Although a strong advantage of the expander of this invention is its ability to operate with the external devices on a quasiasynchronous manner, the communication between the expander and the computer must be organized so that the transfer of data occurs in synchronism with the computer timings. In addition to the timing pulses, a master clock phase, PHA, is provided to aid in the previously described synchronous communication where this is needed. A reset pulse, labeled RES, may be generated from the computer as controlled by a computer program. Although this RES control signal is further illustrated in specific detail within the network of FIG. 2A, it is to be understood that the RES pulse may be used to reset the entire logic system of the expander as will be explained in connection with the clear signal generating network 34.

A computer real time access channel 46 is provided which is composed of sixteen data bits which are respectively labeled from 0 through 15. This data channel 46 serves both the function of inputting as well as outputting of data from the computer 10. Since a large number of signals may be connected to the computer access channel, one should visualize the access channel in the simplified form presented in FIG. 2A with it being understood that with conventional gating techniques, one may multiply the effective number of communication lines with this channel to as many as desired. The particular bits are numbered in FIG. 2A to illustrate in the specific embodiment how several commands from the computer may be interpreted by the controller 12.

The computer 10 may be interrupted during its operation by applying a signal at various levels labeled 1, 2, 3 and 4. Within the computer, the interrupt causes the computer to jump to a predetermined memory location which will direct it to jump to still another location where it will automatically store the address of the location of the instruction it was executing when the interrupt occurred and then proceed to execute instructions according to a subroutine. Depending upon the level of interrupt and corresponding therewith the computer generates a series of signals corresponding to the interrupt levels, i.e. 2, 3, 4 and 5, which are used to aid in the identification of the particular feature adapter causing or from which the interrupt arose. In the event information is to be read by the computer or inputted to the computer, a data ready signal DR is provided to inform the computer that the data are ready for entry into memory.

In the particular communication mode adopted between the computer 10 and the controller 12, the computer, when communicating through the computer access channel 46, first generates a word indicative of the address, i.e. the channel and feature adapter and includes therein specific functions to be performed, and some time later within a predetermined time presents data that are to be gated to a particular device. In a similar manner, the flow of information to the computer from the controller is so organized that initially identification or address information is provided indicating the particular external device that communicates with the computer, followed within a preselected time by a data word.

As previously mentioned, in order for the computer 10 to communicate with the expander, a recognition circuit 20 is employed. This circuit demands that for the computer to communicate with the expander, the bits 0 and 1 of the computer access channel, i.e. at the address portion thereof, be set equal to 1. Thus the 0 and 1 bits are connected to AND gate 48 which drives a flip-flop 50. When flip-flop 50 is set, a recognition signal is generated, labeled SAC, informing the controller that the information in the computer access channel is addressed to it and must be acted upon.

In order to understand the general logic diagram employed in FIG. 2, it is to be realized that the logic functions such as AND gates are indicated by terminating the lines connected thereto at the base 51 of the AND gate 48. On the other hand, if the gate is to serve as an OR circuit, the lines will pass through the base line terminating at the bottom lines of the gate. Furthermore, the storage of signals in flip-flops is generally indicated by placing an F in the block and where two signals are shown connected to a flip-flop, the upper one is considered to set the flip-flop and the bottom signal is considered to reset it. In some cases, additional lines are connected to the flip-flop network to either cause a resetting thereof or a flipping as will be specifically indicated.

With the flip-flop 50 energized and the SAC signal presented, the SAC signal is applied to a bank of seven gates 52 to enable them. These gates 52 are respectively connected to selected bits of the computer access channel. i.e. bits 2, 3, 4, 8, 9, 10 and 11. Enabling of the gates 52 permits the setting of a bank of seven flip-flops 54 to store the information passed by the gates 52. The flip-flops 54 connected to the gates 52 driven by bits 2, 3 and 4 are selected as channel indicating bits. With three bits allocated for channels, a total of eight channels may then be decoded by a decode network 56 which provides at its output eight distinct lines, the signals on which are indicative of the channel to be addressed. In a like manner, the flip-flops 54 connected to those gates 52 which are coupled to bits 8, 9, 10 and 11 are used to store that feature adapter that is addressed by the computer. Accordingly, 16 feature adapters may be addressed and each is identified by decoding the flip-flops in a decode network 58 which provides at its output 16 lines, the signals on which are indicative of the particular feature adapter being addressed. For simplicity purposes, the channel decode signals are labeled CH1 through CH8 and the feature adapter signals are labeled FA1 through FA16. Generally the channel and feature adapter identification signals remain active throughout the addressing cycle until the flip-flops 54 are reset by a clear signal CLR generated by the clear signal generating circuit 34. The decoding performed in the networks 56 and 58 is accomplished by standard diode techniques or others as desired and is so well known that further description thereof will not be necessary.

Although the expander recognition circuit has been activated, the channel and feature adapter have been identified for address purposes, the particular function to be performed by the data or the network is not clarified unless selected bits from the computer access channel are decoded to recognize particular commands and the like. For this reason, bits 5, 6 and 7 of the computer access channel are applied to corresponding AND gates such as 60 to be thereupon decoded in a network 62 "on the fly" with at least 5 of the possible particular instructions decoded by network 62 being stored in flip-flops such as 64. It should be realized that the AND gates such as 60 are also enabled by the SAC signal and that the flip-flops such as 64 are cleared by the CLR signal. The specific functions decoded by network 24 are a control command signal labeled C, a read signal labeled R, a write signal labeled W, a response to interrupt signal labeled SI and an identify channel signal labeled SD. Other functions of course may be decoded since three bits are used in the computer access channel to indicate the particular function to be decoded, and a dashed line labeled "option functions" is representative thereof.

Briefly stated, the SD and SI signals are issued after the computer has been interrupted and effectively serve as interrupt responses from the computer inquiring as to which feature adapter, SI, and which channel, SD, caused the interrupt. Since the channels are grouped to form a feature adapter and the interrupts from devices connected to channels are correspondingly grouped so that but one interrupt signal can arrive from a feature adapter, the computer must always respond with an interrupt inquiry signal SI followed by a second interrupt response inquiry labeled SD.

With the write signal W is meant that the computer intends to address a particular feature adapter and perhaps a channel therein to supply it with information. The read signal R is indicative of the fact that the computer wishes to input data from a particular external device connected to a channel in a feature adapter. The control signal C serves the specific purpose of masking interrupts from the several feature adapters connected to the controller, unmasking them and certain buffer operations in particular feature adapters.

When a control command signal C has been decoded in the network 24, it is applied to enable a pair of AND gates 66 in network 26. The AND gates 66 are coupled to selected bits in the computer access channel, i.e. bits 14 and 15. If a bit in location 14 occurs during the command control function C, an unmasked signal labeled UM is generated and when a bit at location 15 arises, a masked signal labeled M arises. The mask and unmask signals M and UM are applied to a specific feature adapter as identified by the device identification network 22. It thus should be realized that the masking and unmasking signal is to be used in conjunction with particular address information.

When an external device interrupts the computer, a storing device is employed to retain this interrupt request. It is important that after the interrupt has been acted upon, the storing device be cleared to accommodate future interrupts. This clearing or resetting may be specifically controlled by the computer in the network 28 by applying the bit location 15 in the computer access channel to an AND gate 68 which is also enabled by the channel identification signal SD. The particular use to which the network 28 is put in conjunction with a feature adapter will be explained in relation to network 26. It should be understood that the clear interrupt signal CI obtained at the output of the AND gate 68 in network 28 is also addressed to a particular channel within a feature adapter in accordance with the device identification network 22. Although it was previously explained that the SD signal is indicative of a request by the computer to the controller to identify the particular channel in a feature adapter causing an interrupt, the use of the SD signal in network 28 implicitly assumes that the channel information is known, and thus the SD signal as employed in network 28 serves a different purpose from that customarily used in connection with network 36. Such double use of the SD function signal is of course recognized by the controller.

Several timing signals are employed since it is recognized that particular functions decoded by network 24 take a predetermined number of timing pulses to complete. Thus, in network 30, the SAC signal, after its decoding by network 20, sets a flip-flop 70 which in turn is applied to an AND gate 72 that is enabled by the next occurring $T_0$ timing pulse, thus setting the flip-flop 74. The setting of flip-flop 74 produces a first desired timing signal labeled $E_2$ which is applied to an AND gate 76 to which is also applied a $T_6$ timing pulse signal. The output of AND gate 76 is coupled to an OR gate 78 to set a flip-flop 80, the output of which is representative of a timing signal $E_3$. In addition, the OR gate 78 has two other inputs labeled R and W, corresponding respectively to the read and write decoded functions from network 24. Thus the network 30 produces an $E_3$ signal whenever an R or W pulse has been decoded, thus requiring a full three cycles to complete the operation of the controller 12. In addition, the $E_2$ signal recognizes that the function to be performed may be completed within its determined time span. To give some indication of the time span occupied by the $E_2$ and $E_3$ signals, it should be realized that $E_2$ recognizes that the operation takes two cycles corresponding to the time period from $T_0$ through $T_4$ and it is to be understood that the timing signal $E_3$ corresponds to a third cycle having a time duration as determined by the time period between the timing pulses $T_4$ and the end of $T_6$. The resetting of the flip-flops 70, 74 and 80 in the network 30 is accomplished upon the occurrence of a CLR signal.

When the computer desires information, it is determined that a signal must be provided indicating to the computer that its request for data is presently being honored, i.e. that the data is ready for entry into the computer. Thus in response to a read signal from the computer and as decoded by the network 24, it is determined that a data ready or DR pulse must be generated during the third cycle, corresponding to $E_3$, at which time the data to be inputted to the computer must be ready. This signal is generated by applying the R and $E_3$ pulses to AND gate 82 which connects to an OR gate 84 to set a flip-flop 86 so that supplies the desired data ready (DR) signal to the computer. In addition, it is recognized that when the computer desires to know which feature adapter or which channel has caused an interrupt, this information be supplied to the computer through the computer access channel and again a DR or data ready signal must be supplied. Accordingly, the decoded functions SI and SD are applied to an OR gate 88, the output of which is coupled to an AND gate 90 which is enabled by the timing signal $E_2$ to produce an output connected to OR gate 84 to also set the flip-flop 86 and produce the data ready signal. The flip-flop 86 is cleared by the CLR signal.

In summary, the read instruction from the computer presents data to the computer during the $E_3$ cycle whereas the responses to the computer inquiries as decoded by the SI and SD signals provide information during the $E_2$ cycle.

The clear signal (CLR) generated in network 34 arises for a variety of conditions. The conditions are determined by inputs to three AND gates 92, 94 and 96. Connected to the inputs of AND gate 92 are four signals, the timing pulse signal $T_6$, the timing signal $E_2$ and the inverse (NOT) of the read and write decoded signals W and R. This inverse function is illustrated by applying a line over the W and R symbols. The generation of the inverse of W and R may be accomplished by standard inverter technology as is well known in the digital art. The output of AND gate 92 therefore arises whenever the $T_6$ and $E_2$ signals occur provided neither a write nor a read function are decoded in network 24. Connected to the input of AND gate 94 are two enabling signals, namely $T_6$ and the timing signal $E_3$, and coupled to the input of AND gate 96 is the function control signal C and timing pulse $T_0$. Thus whenever the control function C is decoded, the next $T_0$ timing pulse, i.e. the one occurring during the second cycle, causes an output from AND gate 96. All three AND gates 92 through 96 are connected to an OR circuit 98 which has its output coupled to a flip-flop 100 which is used to generate through an OR gate 102 the desired clear signal CLR. Another input provided to the OR gate 102 is the RES or reset signal as generated from the computer, thus permitting the computer to reset the entire controller. The flip-flop 100 may be reset upon the generation of the CLR pulse after a suitable delay interval as indicated by the CLR' signal applied to the resetting input of flip-flop 100.

Figure 3:
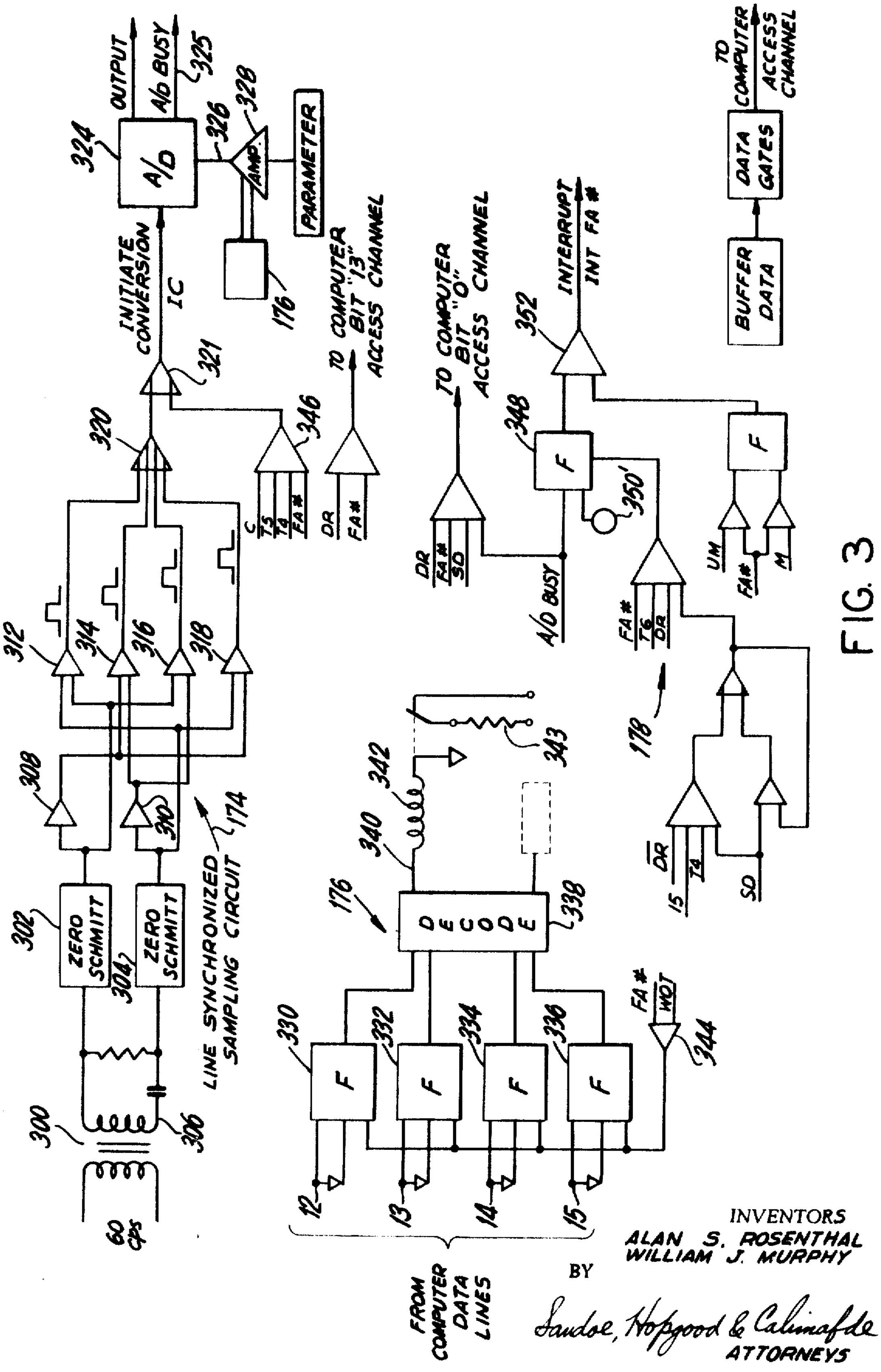
FIG. 3 is a logic diagram with several circuit features illustrating the employment of an analog-to-digital converter with the expander.

At this point, the several command and control signals used with the controller have been described with the exception of a writing control function and several specific feature adapters to be described in relation to FIG. 3. The writing function involves the decoding of a write signal labeled WOT in network 44. This WOT signal is produced by applying the decoded function signal W, the timing pulse $T_4$ and the $E_3$ signal to an AND gate 104. When the WOT signal has been generated, the data presented in the computer access channel is transferred to the specific channel determined by the decoding network 106 connected to the channel decode flip-flops 54 in network 22. The channel address signals utilized in network 44 are thus essentially like those decoded in network 56 of the device identification circuit 22. Accordingly, the decoded channels to which the data is to be transmitted upon occurrence of the WOT pulse are labeled CH1' through CH8'.

The interrupt from external devices can be understood with reference to network 36. Assume, for instance, that an external device is connected to the first channel of the NO 1 feature adapter and provides on a line 108 an interrupt signal labeled $INT_1$. The signal indicating an interrupt on line 108 is selected to have a pulse form so that for instance on its negative going slope, a flip-flop 110 is set, and when the line returns positive, the AND gate 112 to which both the flip-flop 110 and the line 108 are connected is enabled to reproduce the interrupt signal which appears as a constant level and is indicated by the label $INT_1$. In a similar manner, interrupts from other external devices coupled to other channels within the group of channels controlled by feature adapter 01 may generate interrupts as indicated by the several $INT_2$, $INT_3$ and $INT_4$ signals. A reset of the interrupt flip-flop 110 is provided by an AND gate 114 which has connected to it a decoded channel identification signal labeled $CH_1$ and a general enabling line 116. The clearing of the interrupt is to be explained in connection with network 28.

In addition to the INT signal which is used to generate an interrupt, a signal must be provided which, at a suitable time, informs the computer which particular channel within a feature adapter has caused the interrupt. This is accomplished by connecting the output of flip-flop 110 to an AND gate 118 to generate, upon enabling by a pulse on a line labeled alpha, an output signal labeled $IS_1$, meaning interrupt status signal for channel 1. The interrupt status signal $IS_1$ is connected to a preselected bit in the computer access channel which, upon entry into the computer, will be interpreted by the computer program as indicative of the channel causing an interrupt.

The interrupt signal $INT_1$ is connected to an interrupt interconnection network 38 at line 120 as can be seen from the logic diagram in network 38. The line 120 is connected to an OR gate 122 and an AND gate 124. The output of OR gate 122 corresponds to the computer interrupt level 1 so that the initiation of the interrupt signal from the external device coupled to the first channel of the feature adapter 01 will eventually produce an interrupt at the level 1. In a similar manner, and for illustrative purposes, the interrupt of the second feature adapter INT $FA_2$ is shown connected to the OR gate 122' corresponding to the second computer interrupt level and in like fashion interrupts INT $FA_4$ are shown connected respectively to OR gates 122'' and 122''' respectively corresponding to the interrupt levels 3 and 4. This interconnection is arbitrary and if desired one may connect the interrupt line INT $FA_2$ to line 126 to produce an interrupt on the first level. The interconnection is determined by computer programming considerations and the type of external device employed.

Since as previously mentioned the computer must be informed as to which particular feature adapter has caused the interrupt, the INT $FA_1$ signal on line 120 is applied to AND gate 124 which is enabled by a pulse obtained from an AND gate 128, to which are connected the decoded function signal SI and computer interrupt return signal 2'. Thus, during operation, the external device first produces an interrupt signal causing the selected level 1 to interrupt the computer which thereupon issues a first computer interrupt response signal SI (decoded in network 22) and at the same time enables the level 2'. With both inputs of AND gate 128 active, its output provides the desired enabling signal to AND gates such as 124. The output of AND gate 124 for this reason is coupled to a selected bit in the computer access channel which the computer program will recognize as the particular feature adapter that caused the interrupt. In a like manner, interrupts from other feature adapters will produce both the interrupt at any desired level as well as provide the information at the particular computer access channel as to which feature adapter has caused an interrupt. For instance, an interrupt from the feature adapter 02 indicated as an output from the general network 36' may be applied to the OR gate 122' and produce an output to the computer access channel when the AND gate 130 has been enabled by the SI signal and the 3' signal from the computer. The other feature adapter identification enabling signals for the various levels 3 and 4 may be obtained from AND gates 132 and 134 utilizing input signals as indicated within the logic diagram of network 38. In summary, the network 38 first causes an interrupt and thereafter tells the computer which feature adapter initiated the interrupt.

After having been informed which feature adapter caused an interrupt, the computer issues the second interrupt response inquiry which is decoded by the network 24 as the SD signal. The computer must, in response to this second inquiry, be advised as to which channel caused the interrupt. Accordingly, the SD signal, the data ready signal DR and the identified feature adapter signal $FA_1$ are applied to the inputs of AND gate 136 in the network 36. Since the DR signal arises during the $E_2$ cycle as indicated in network 32 at the output of AND gate 90 thereof, the output from AND gate 136 goes active on a line labeled alpha during the $E_2$ cycle and enables the AND gate 118. The output of AND gate 118 presents to the computer at the appropriate selected bit location of the data access channel the information that channel 01 of feature adapter 01 was the interrupting channel.

It should be realized here that during the second interrupt response inquiry from the computer, there are no channel signals decoded by network 56 in circuit 22 (bits 2, 3 and 4 being in the zero state) for the obvious reason that the computer does not know which channel caused the interrupt. However, as soon as the interrupt has been fully recognized by the computer as to channel and feature adapter, it is generally desirable to clear the interrupt previously stored in the flip-flop 110. This may be accomplished by utilizing the circuitry of network 28 by issuing as controlled by the computer program a word at the output of the computer access channel which identifies the feature adapter and channel causing the interrupt, has a bit at location 15 and carries the instruction corresponding to the SD function. The timing pulse $T_4$, the signal SD and the data ready signal DR as well as the CI signal from the network 28 are applied to inputs of AND gate 138, the output of which sets a flip-flop 140, the output of which in turn is connected to still another AND gate 142 to which the alpha signal from AND gate 136 and timing pulse $T_6$ are connected as inputs. When the input conditions to AND gate 142 are fulfilled, its output on line 116 is provided with a pulse which enables gates such as AND gate 114 to therewith reset and clear the interrupt storage flip-flops such as 110. Since the computer control interrupt clearing feature includes in its address portion an indication of the channel for which the interrupt is to be cleared, it is to be realized that the CH1 line decoded by network 22 and connected to AND gate 114 was enabled, thus permitting the resetting of the flip-flop 110. In a similar manner, the interrupt storage for each of the channels such as CH2, CH3 and CH4 may be cleared, permitting new interrupts to arise. Each of the feature adapters such as 36′ and 36″ are provided with the interrupt clearing means just described for the network 36.

The channel interrupt signals INT at the outputs of AND gates such as 112 are not directly coupled to the line 120, but are first passed through a selective masking circuit to permit a selective masking of interrupts by the computer. This masking function is quite important for the process controlling computer because, for instance, at startup time, all of the external devices are likely to produce an interrupt signal. Since all these interrupts would slow down the startup operation of the computer, the masking function and circuitry included in each feature adapter conveniently permits the computer to enable selective external devices to interrupt in an orderly manner. Accordingly, the interrupt signal such as obtained from the output of gates such as 112, 112′, i.e. $INT_1$ and $INT_2$ are connected to a common OR gate 144 the output of which is coupled to an AND gate 146. The AND gate 146 is enabled by an output from flip-flop 148 which is set by an AND gate 150 and reset by AND gate 152. AND gate 150 is connected to the unmasking signal, UM, from network 26 and the feature adapter identification signal $FA_1$ and AND gate 152 has its inputs coupled to the mask signal, M, from network 26 as well as the feature adapter identification signal $FA_1$. Ordinarily, the flip-flop is set by the output of AND gate 150 and will enable the AND gate 146, permitting the interrupts arising at the input of the OR gate 144 to pass on to the network 38. However, when the computer issues a control command signal, C, accompanied by a bit in location 15, the mask signal M is generated and provided the $FA_1$ signal is also decoded the flip-flop 148 is reset and the AND gate 146 is disabled, thus preventing interrupts from passing on to the network 38.

As thus described, the expander is provided with substantial versatility in controlling and managing a large number of external devices coupled to various channels and feature adapters. It would not be uncommon to employ, say, eight channels for each feature adapters and utilize a total of 16 feature adapters, thus permitting a total of 128 different external devices connected to the general purpose computer 10. Each device may cause an interrupt and the computer will respond to it in the manner as heretofore described. If several interrupts arise at the same time, the fact that the interrupts are stored and not cleared unless specifically directed by the computer permits any number of simultaneously occurring interrupts to be handled.

The emphasis at this point has been substantially directed at the controller and the several feature adapters and their control circuitry. It should be realized however that the eternal devices are utilized primarily to provide data for use by the computer or accept data therefrom. This data is digital so that a plurality of bits of the computer access channel may be energized at the proper data ready time. The interconnection of the numerous channels and feature adapters is illustrated in a simplified manner by the interconnection network 40. Assume, for instance, that three external devices are connected via data lines such as 154, 154′ and 154″ to gates 156, 156′ and 156″. The gates are enabled by channel identification signals such as $CH_1$, $CH_2$ and $CH_3$ acting on the gates. The output of the gates comprise a plurality of data lines, for instance 16 each, with corresponding lines connected to one another to provide 16 lines feeding into a feature adapter gate 158. The feature adapter gate 158 is enabled by the feature adapter identification signal $FA_1$, to permit the data on the line to pass on to the computer access channel 46. In a like manner, the data for the other feature adapters such as $FA_2$ and $FA_3$ is coupled to the computer access channel. In a typical operation after for instance a suitable interrupt by an external device, say channel 1 of feature adapter 1, the computer may issue a read function control signal through a computer access channel 46. In addition to this read function decoded as an R signal, the particular channel $CH_1$ and feature adapter $FA_1$ are identified and decoded by the network 22. The gates 156 and 158 are thereupon enabled. However, the data is not permitted to pass through the computer access channel until the data ready signal DR enables the AND gate 159. It should be understood here that it is not always necessary to read information from an external device in response to an interrupt caused by the latter. In some situations, the computer may call for the data without an interrupt by following the last-described read function.

In the supply of data from the computer to an external device, a somewhat similar procedure to that described for the read function is employed. In this case, the computer provides at its computer access channel an address signal including the channel and feature adapter to be supplied with the data. With reference to network 42, the feature adapter identification signal enables a plurality of gates such as 160 to interconnect the computer access channel to various channel gates such as 162, 162′ and 162″. The latter gates are enabled by the WOT signal generated in network 44 to thereupon pass the data on the computer line to the external device. In a like manner, data for other feature adapters such as indicated at 166 and 169 may be provided. In addition, an external device which ordinarily only receives data from the computer may request this data by causing an interrupt in a manner described for network 36. The computer program will recognize that the request from this particular feature adapter, of course after suitable identification in the manner described for network 36, requires an output from the computer in the manner described in connection with network 42.

Accordingly, a novel expander system for a general purpose computer is described wherein a plurality of input and output feature adapters may be connected to a real time computer access channel permitting asynchronous interruptions of the computer program resulting in the inputting or outputting of data as well as the synchronous communication with external devices in accordance with computer control programs. A specific use for a feature adapter may be such as the analog-to-digital converter arrangement shown in FIG. 3. In the FIG. 3 embodiment, the interconnection of the computer access channel with the analog-to-digital converter is typically illustrated. The circuitry comprises in general a line synchronized sampling circuit 174, a computer control amplifier gain setting circuit 176 and an interrupt gating circuit 178.

The synchronized line sampling circuit 174 is primarily employed to permit the analog-to-digital converter to initiate conversions in synchronism with the line frequency. The main reason for doing this is to be found in noise considerations for low level conversions by the analog-to-digital converter. It has been determined that the greatest proportion of noise is caused by AC interfering signals at the line frequency. By sampling a parameter at a time in synchronization with the line frequency, it is possible to effectively remove this source of noise by converting it to a fixed bias. For instance, if a signal to be converted has an absolute magnitude of, say, 500 microvolts, the noise present from the line may be as much as 1 millivolt, and since the polarity of the line-generated noise changes, an arbitrary sampling of a low level parameter introduces variations corresponding to the magnitude of the line-induced noise. On the other hand, if one samples at a consistent rate or in a synchronized manner with the line frequency, then the bias introduced from the line noise may be taken into account in the conversion, and since the bias will hardly vary, a very low signal level may be accurately and reliably sampled.

Thus the 60 cps. line voltage is sampled by use of a transformer 300, the output of which is applied to a pair of zero level Schmitt triggering circuits 302 and 304. The signal from one end of the transformer at 306 is passed through a conventional 90° phase-shifting network to the Schmitt trigger 304.

The outputs of the Schmitt triggers 302 and 304 are passed through a decoding network to generate four pulses, each occurring at a selected phase interval of the line frequency. Since the Schmitt triggers 302 and 304 sense the occurrence of the zero level, and since a 90° phase-shifting network is employed, the pulses respectively represent zero, 90, 180, and 270° phase points in the line frequency. It is to be realized of course that many more points may be detected by utilizing Schmitt triggers that sense different levels and employing a different phase-shifting arrangement. However, for the purposes of illustrating the line synchronization feature of the analog-to-digital converter, the particular circuitry of FIG. 3 suffices. The decode mechanism employed at the output of the Schmitt triggers involves a pair of inverters 308 and 310, the outputs of which are selectively connected with the uninverted outputs from the Schmitt triggers to AND gates 312, 314, 316 and 318. By recombining the outputs of the AND gates at the OR circuit 320, a plurality of pulses, i.e. four, are generated during each cycle of the 60-cycle line. If desired, the outputs from the AND gates may be directly connected to an analog-to-digital converter circuit for initiating conversions without the recombination provided by OR gate 320. The output from the OR circuit 320 is coupled to another OR circuit 322 to permit initiation of conversion under control by the computer as will be described.

The analog-to-digital converter which actually performs the conversions is shown in block diagram and need not be further described. Suffice it to say that it is a conventional type, employing a plurality of gated and weighted circuits connected to an analog input to provide a digital input for entry into the computer and representative of the magnitude of the input to the analog-to-digital converter. The analog-to-digital converter 324 has an input on line 326 from a preamplifier 328 such as a standard operational amplifier and which may be arranged to have its gain varied in a digital manner and under control by the computer as described in relation to circuit 176. The gain control of the amplifier 328 by network 176 is controlled by the computer by selecting predetermined bits such as 12, 13, 14 and 15 from the computer access channel and applying these to flip-flops 330, 332, 334 and 336. A decode network 338 is connected to these flip-flops and decodes a total of 16 different gain determining signals on lines such as 340. Line 340 is connected to a relay coil 342 which, when energized, places a selected feedback resistor 343 in the circuit of amplifier 328 to thereby alter its gain in accordance with the computer output data on bits 12, 13, 14 and 15. In this way, 16 different gain settings may be selected. It is a simple matter, of course, to add as many gain variable settings as desired. The flip-flops 330 through 336 are permitted to accept the information on the bits 12 through 15 in accordance with the enabling signal obtained at the output of an AND gate 344 having its inputs coupled to the WOT line described in relation to network 44 and the appropriate feature adapter determining signal decoded by network 22.

The computer initiation of the conversion by the analog-to-digital converter 324 is accomplished by utilizing a control command signal C from the computer as decoded by network 24 and applied as signal C to AND gate 346. Since the C signal is also used to generate the masking and unmasking signal by utilizing the bits 14 and 15, the additional condition applied to the AND gate 346 is that neither one of bits 14 or 15 may be energized, i.e. having a "1," as indicated by the NOT indicating striped line over the numbers at the input of the AND gate 346. In addition the feature adapter identification signal is applied so that upon the enabling of all the inputs to AND gate 346, an IC signal is obtained at the output of OR gate 322 to initiate the A/D conversion.

Interrupts from the A/D feature adapter are produced by employing a busy signal generated in the converter as indicated on line 325 and applying this to a flip-flop 348 which normally is in the zero state except for when the line 325 changes to a state indicating that the A to D conversion is complete. The output from the flip-flop 348 is connected to AND gate 352 to prevent or enable an interrupt depending upon the masking and unmasking function as employed in the feature adapter circuit 36.

In view of the recombination at the output or OR gate 320 of the line synchronizing signals for initiating the conversions of the analog-to-digital converter, it is recognized that several conversions will arise in sequence which the computer program must sort out. The A to D converter is therefore provided with a buffer capable of storing the data generated by the A/D converter for each group of line synchronized samples. The buffer stored data may then be read into the computer via the computer access channel 46 by appropriate gates and enabling signals in a manner similar to that employed in network 40.

Figure 4:
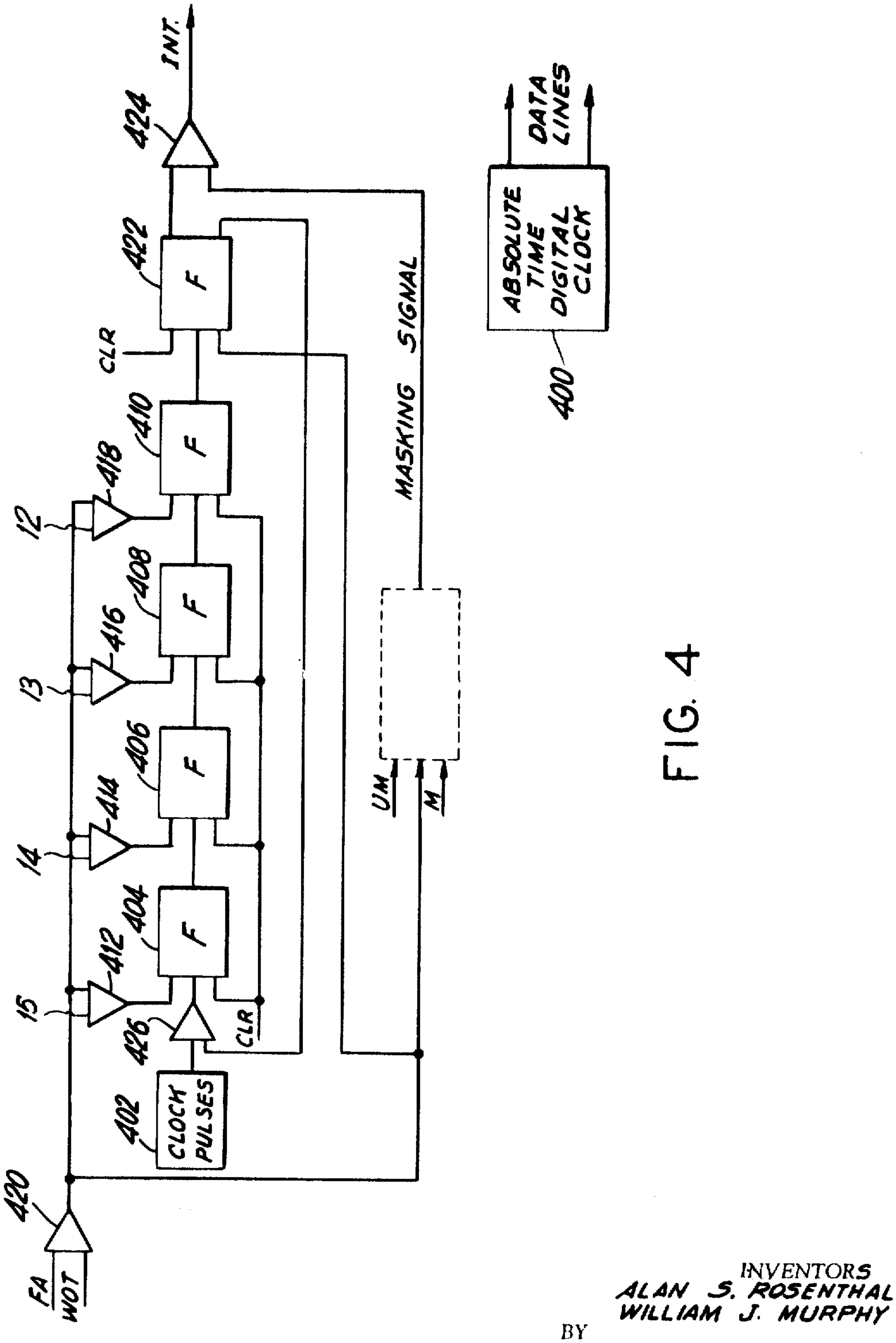
FIG. 4 is a logic diagram illustrating a variable interrupt device in conjunction with an absolute clock time indicator.

FIG. 4 illustrates how the computer may interrogate a clock at presettable intervals. A clock 400 provides a binary output equivalent of the absolute time. This output is presented on data lines for inputting to the computer in the manner described for network 40. The absolute time information is often needed to schedule events, such as for instance the periodic monitoring of special sensors.

The computer may control the frequency with which it is advised of the absolute time. This is accomplished by assigning one feature adapter to accomplish the interface function with the absolute time digital indicator 400. A source 402 of clock pulses at a frequency of about 1kHz. drives a four-stage counter composed of flip-flops 404, 406, 408 and 410. Any number of stages may be employed, but for the purposes of this embodiment a maximum division by a factor of 16 suffices. The output of the counter flip-flop 410 produces an interrupt of the computer in the manner described for network 36 and after suitable identification by the computer as described heretofore, the clock 400 indicated time is inputted to the computer.

The counter flip-flops 404 through 410 are provided with presettable inputs whereby under computer control, a predetermined count may be placed into the counter to correspondingly decrease the intervals at which an interrupt from the counter arises. Thus four AND gates 412, 414, 416 and 418 are provided having their outputs coupled to the presettable inputs of the flip-flops in the manner shown in FIG. 4. Bits 12, 13, 14 and 15 of the computer access channel are coupled to the AND gates 418, 416, 414 and 412 respectively. The latter AND gates are enabled by the output of an AND gate 420 which is enabled by the WOT signal in conjunction with the appropriately decoded feature adapter signal FA.

The output of flip-flop 410 is coupled to a flip-flop 422 which normally is set thereby in the interrupt enabling mode causing an interrupt from AND gate 424 provided of course that the masking signal input to gate 424 is in the unmasking state. The masking signal is derived as in network 36. The setting of flip-flop 422 causes a disabling input to be placed on gate 426 so that the pulses from clock source 402 are prevented from reaching the counter flip-flops. If desired, computer controlled relays or flip-flops could be employed to maintain the preset inputs to the counting flip-flops once this has been set by the computer. With the presettable inputs, the computer may vary the interval of the interrupts as desired.

We have thus described a unique system for expanding a real time access channel of a general purpose computer. For instance, the number of channels and feature adapters that may be added to a system may be expanded as desired in accordance with the complexities of the manufacturing process to be controlled. In addition, particular functions may be easily adopted such as communications with teletype systems and real time clock interrogations and so on. The ability to mask and unmask selected feature adapters provides a great versatility and renders the expander adaptable for a great variety of applications.

While the principles of the invention have been described in connection with specific apparatus, it is to be clearly understood that this description is made only by way of example and not as a limitation to the scope of the invention as set forth in the objects thereof and in the accompanying claims.

We claim:

1. An expander for a digital computer real time access channel for real time communication with a plurality of devices located external to the computer, comprising
 a plurality of feature adapters composed of a plurality of channel data lines coupled to external devices and control gates which selectively interconnect the channel data lines in the feature adapters to the real time computer access channel.
 controller means for directing the flow of data between the real time computer access channel and said channel data lines, said controller means including:
  means actuated by an external device for generating an interrupt signal to the computer,
  means responsive to interrupt signals from devices coupled to a predetermined feature adapter group of data lines for storing said interrupt signals,
  means responsive to said predetermined group of stored interrupt signals for generating said interrupt signals at preselected computer determined interrupt levels,
  means responsive to a computer interrupt response inquiry signal for supplying to the computer a signal to identify the interrupting external device.

2. The device as recited in claim 1 wherein the controller means further includes:
 means responsive to selected bits in the computer access channel for identifying the computer interrupt response inquiry signal and generating a signal indicative thereof,
 means responsive to the interrupt response inquiry signal for coupling the stored interrupt signal to the computer access channel at a preselected bit location thereof for the identification of the interrupting device.

3. The device as recited in claim 2 wherein said controller means further includes:
 means responsive to a first computer interrupt response inquiry signal for identifying to the computer the feature adapter group of data lines from where the interrupt signal was generated, and
 means responsive to a second computer interrupt response inquiry signal for identifying the particular channel data lines associated with the interrupting device.

4. The device as recited in claim 3 wherein said means responsive to the second computer interrupt response inquiry signal further includes
 means responsive to preselected output bits from the computer access channel for decoding a feature adapter signal representative of the group of data lines causing an interrupt, and
 means actuated by the feature adapter signal for generating an interrupt status signal representative of the particular device connected to data lines in the group causing the interrupt and coupling the interrupt status signal to a predetermined bit of the computer access channel at a predetermined time.

5. An expander for a digital computer real time access channel for real time communication with a plurality of devices located external to the computer comprising
 a plurality of feature adapters composed of a plurality of channel data lines coupled to external devices and control gates which selectively interconnect the channel data lines in the feature adapters to the real time computer access channel,
 controller means for directing the flow of data between the real time computer access channel and said channel data lines, said controller means including:
  means for generating an interrupt signal to the computer from external devices,
  means responsive to interrupt signals from external devices which are coupled to a predetermined feature adapter group of data lines for storing said interrupt signals,
  means responsive to said stored interrupt signals for generating said interrupt signals at preselected computer determined interrupt levels,
  means responsive to selected bits in the computer real time access channel for identifying a computer interrupt response inquiry signal and generating a signal indicative thereof,
  means responsive to a first identified interrupt response inquiry signal for coupling the stored interrupt signals to preselected bit locations of the computer access channel for identification to the computer of the feature adapter group of data lines from where an interrupt signal was generated,
  means responsive to a second identified computer interrupt response inquiry signal for generating an interrupt status signal identifying the particular external device connected to the feature adapter group of data lines causing the interrupt and coupling the interrupt status signal to a predetermined bit of the computer access channel at a predetermined time,
  means responsive to a preselected bit location in the computer access channel and actuated by the first computer interrupt response inquiry signal for generating an interrupt clearing signal for selectively clearing the stored interrupt signal upon complete identification of the device causing the interrupt.

6. The device as recited in claim 5 wherein said controller means further includes:
 means responsive to selected bits in the computer access channel for decoding a signal representative of the second computer interrupt response inquiry,
  means enabled by said second interrupt response inquiry signal and responsive to a selected bit in the computer access channel for generating a clearing interrupt signal for removing the stored interrupt upon complete identification of the device causing the interrupt.

7. An expander for a digital computer real time access channel for real time communications with a plurality of devices located external to the computer comprising:
 a plurality of feature adapters composed of a plurality of channel data lines coupled to external devices and control gates which interconnect the channel data lines in the feature adapter to the real time computer access channel
 controller means for directing the flow of data between the real time computer access channel and said channel data lines, said controller means including
 means actuated by an external device for generating an interrupt signal to the computer,
 means responsive to a computer interrupt response inquiry signal for supplying to the computer a signal to identify the interrupting external device,
 an analog-to-digital converter coupled by a feature adapter to the real time access channel and having a conversion initiating input and providing a busy indicating output signal, said converter converting an analog parameter signal from an external device,
 means actuated by the busy signal for producing an interrupt signal to the computer,
 storage means for storing said interrupt signal, and
 means for clearing said storage means at a preselected time after transfer of converted data from the analog-to-digital converter to the computer.

8. The device as recited in claim 7 and further including:
 amplifier means for amplifying the analog parameter signal prior to analog-to-digital conversion, and
 means controlled by preselected bits in the computer real time access channel for varying the gain of said amplifier means.

9. The device as recited in claim 8 wherein said gain varying means further comprises:
 storage flip-flops coupled to the selected gain setting bits,
 decode means coupled to the flip-flops and providing a plurality of gain control signals, and
 means responsive to the decoded gain control signals for inserting corresponding gain varying resistances in the amplifier means.

10. The device as recited in claim 9 wherein the gain resistance varying means comprises a plurality of relays actuated by the gain control signals and a plurality of switches, each controlled by a relay, and gate means for selectively altering the bit information placed in said storage flip-flops.

11. The device as recited in claim 7 and further including:

means responsive to selected bits in the computer access channel for generating a masking and unmasking signal, and gate means interposed with said interrupt signal and actuated by the masking and unmasking signal for respectively inhibiting and enabling the interrupt signal from passing to the computer.

12. The device as recited in claim 7 and further including:

means synchronized to an AC line frequency for generating a plurality of line synchronized pulses, said line synchronized pulses being coupled to the analog-to-digital converter for initiating conversions thereby.

13. The device as recited in claim 12 and further including:

means responsive to selected bits in the computer access channel for producing an initiate conversion signal and applying said last-mentioned signal to the analog converter for causing computer initiated conversions thereby.

14. The device as recited in claim 7 wherein one of said feature adapters includes:

a digital output producing absolute time indicator selectively coupled to the computer access channel, a source of clock pulses, a presettable counter driven by the source of clock pulses and producing a periodic output signal corresponding to a clock initiated interrupt signal, and means responsive to selected bits in the computer access channel for presetting a count in said counter and correspondingly varying the interval between said periodically occurring clock initiated interrupt signals.

15. The device as recited in claim 16 wherein said masking and unmasking signal generating means includes:

means responsive to selected bits of the computer access channel for decoding a mask command signal, means responsive to selected bits of the computer access channel for decoding a feature adapter signal representative of the group of data lines coupled to external devices causing the interrupt signal, and gating means enabled by the feature adapter signal and responsive to the mask command signal for selectively inhibiting and enabling the interrupt signal with said masking and unmasking signal.

An expander for a digital computer real time access channel for real time communication with a plurality of devices located external to the computer comprising:

feature adapters each composed of a group of data lines coupled to external devices and control gates for selectively interconnecting groups of data lines to the computer real time access channel, controller means for directing the flow of data between the computer access channel and said feature adapter groups of data lines, with said controller means including:

means responsive to a signal generated from an external device coupled to said group of data lines for generating a computer interrupt signal, means responsive to selected bits of the computer real time access channel for decoding a mask command signal, means responsive to selected bits of the real time computer access channel for decoding a feature adapter signal representative of the group of feature adapter data lines coupled to the external device initiating the computer interrupt signal, gating means enabled by the feature adapter signal and responsive to the mask command signal for selectively inhibiting and enabling the interrupt signal initiated by said external device.

16. The device as recited in claim 15 wherein said gating means further includes:

first AND gate means responsive to said selected bits used to generate the masking and unmasking signal and enabled by said mask command signal for generating said masking and unmasking signal, and second AND gate means coupled to said masking and unmasking signal and enabled by said feature adapter signal for respectively inhibiting and enabling the interrupt signal.

17. An expander for a digital computer real time access channel for real time communication with a plurality of devices located external to the computer, comprising:

a plurality of feature adapters with selected feature adapters composed of a plurality of channels and control gates for selectively interconnecting the channels to the computer access channel, with feature adapters coupled to the computer access channel to receive data therefrom and transmit data thereto as desired and with external devices coupled to selected feature adapters and channels for communication with the computer through the computer access channel, means responsive to a selected group of bits in the computer access channel for decoding a plurality of identifying feature adapter signals and identifying channel signals, means responsive to a selected group of bits from the computer access channel for decoding control function signals respectively representative of a first interrupt response inquiry and a second interrupt response inquiry from the computer, means associated with each feature adapter and actuated by an external device for generating an interrupt signal to the computer, storing means associated with each feature adapter for storing the interrupt signals from the several devices, means responsive to the first decoded interrupt response inquiry signal for generating a signal indicative of the feature adapter causing the interrupt, means associated with each feature adapter and responsive to the second decoded interrupt response inquiry signal for sensing the stored interrupt signal and generating a signal to identify the channel connected device causing the interrupt, and means responsive to a decoded channel signal corresponding to the identified channel for clearing said storage means.

18. The device as recited in claim 17 wherein said clearing means further comprises:

a first gate means responsive to a selected bit in the computer access channel and actuated by the second interrupt response inquiry signal for generating a clear interrupt signal, and second gate means enabled by said second interrupt response inquiry signal, the clear interrupt signal and a feature adapter identifying signal corresponding to the feature adapter from where the interrupt signal generated for generating a signal for clearing said storing means.